Sept. 27, 1960

J. M. JACKSON ET AL 2,954,158

DIFFERENTIAL DEVICES FOR CASH REGISTERS

Filed May 21, 1957

INVENTORS
JOHN M. JACKSON
FRANK R. WERNER

BY

*Louis A. Kline*
*Richard Van Buskirk*

THEIR ATTORNEYS

United States Patent Office 2,954,158
Patented Sept. 27, 1960

2,954,158

DIFFERENTIAL DEVICES FOR CASH REGISTERS

John M. Jackson and Frank R. Werner, Dayton, Ohio, assignors to The National Cash Register Company, Dayton, Ohio, a corporation of Maryland Filed May 21, 1957, Ser. No. 660,542

9 Claims. (Cl. 235—8)

The present invention relates to differential mechanisms for cash registers and accounting machines and is particularly directed to a device for clutching the primary and secondary differential members of each denominational order together for unitary positioning movement.

In the adaptation of popular types of cash registers and accounting machines to meet the ever-increasing demands of more complex business systems, it becomes necessary to increase the totalizer capacity of such machines. As this is done, space within the confines of the machine is exhausted, and it becomes necessary to rearrange and condense certain mechanisms of the machine in order to obtain the required space for the additional totalizers.

For example, the type of machine chosen to illustrate the present invention, in its original conception, had a single line of totalizers with two sets of totalizer wheels thereon, room being provided for a second line of totalizers, with a maximum of five sets of interspersed totalizer wheels thereon, when justified by expanding use of the machine. The totalizer wheels are engageable with teeth in the peripheries of corresponding primary differential members for actuation thereby. The primary differential members are positioned by corresponding amount keys in adding and subtracting operations and by the corresponding totalizer wheels in reading and resetting operations. There is a corresponding secondary differential member for each primary differential member, said secondary members being connected to corresponding printing wheels and indicators for registering the value of each transaction. A clutch device is provided for clutching the corresponding primary and secondary members together for unitary movement to transmit the positioning of said primary members to said secondary members, the printing wheels, and the indicators.

The use of this popular type of machine has increased to the point where it is now contemplated to equip it with three, and perhaps four, lines of totalizers, and, in order to obtain the required room for these additional lines of totalizers, it was necessary to devise a more compact mechanism for clutching the primary and secondary differential members of each denominational order together for unitary positioning movement, so that said mechanism would be contained within the overall dimensions of the differential members and thus not interfere with the installation of the two additional totalizer lines around the periphery of said differential members.

While the primary differential members are being positioned, as explained above, the corresponding secondary members are restored to a neutral, or zero, position, and thereafter the clutching mechanism functions to clutch the primary and secondary differential members together for unitary movement, whereupon restoration of the primary members, from set position to a neutral, or zero, position, positions the secondary members, the printing wheels, and the indicators accordingly. The original mechanism for clutching the primary and secondary members together comprised a wide-faced pinion of rather large diameter for each denominational order, said pinions being supported by crank arms for moving them into and out of engagement with corresponding teeth in the peripheries of the primary and secondary members, said pinions functioning when engaged with the teeth in the corresponding primary and secondary members to couple said members together for unitary positioning movement. The clutch pinions and their supporting crank arms were located toward the front of the machine, and, inasmuch as the clutch teeth on the periphery of the primary differential members were also used to actuate the corresponding totalizer wheels, said clutch pinions were definitely in the way, in case it was ever decided to expand the totalizer capacity of the machine to three or four lines instead of the customary two lines.

In the present arrangement of the machine, the large clutch pinions and their corresponding crank arms have been entirely eliminated and have been replaced by a more compact clutching mechanism, which includes a small pinion for each order, having integral therewith a notched clutch disk, said pinions being pivotally mounted on the corresponding primary differential members and meshing with internal teeth formed in the outer surfaces of concentric openings in the associated secondary differential members. The corresponding primary and secondary members are clutched together for unitary positioning movement by means of the rounded inner end of a shiftable pitman, which coacts with the notches in the disk to prevent rotational movement of said disk and the associated pinion and thus to clutch the corresponding differential members together for unitary positioning movement. The entire clutch mechanism is located within the overall dimensions of the differential members and does not in any way interfere with the installation of additional lines of totalizers around the peripheries of said differential members.

Mechanism pertinent to the present invention will be described in detail in the ensuing pages, in connection with the figures of the drawing. However, if a more detailed description of mechanism not pertinent to the present invention is desired, reference may be had to copending United States applications Serial Numbers 341,633 and 412,464, filed, respectively, March 11, 1953, now Patent No. 2,880,930, and February 25, 1954, by Frank R. Werner et al., inventors.

With the above outline in mind, it is broadly an object of the present invention to provide an improved amount differential mechanism for cash registers and accounting machines.

Another object is the provision of an improved and compact mechanism for clutching the primary and secondary members of a denominational amount differential mechanism together for unitary movement.

A further object is to provide an improved and compact mechanism for clutching the primary and secondary differential members of one denominational order together for unitary movement, said clutching mechanism being located within the overall dimensions of said primary and secondary members.

With these and incidental objects in view, the invention includes certain novel features of construction and combinations of parts, a preferred form or embodiment of which is hereinafter described with reference to the drawing which accompanies and forms a part of this specification.

Figures 1, 2:
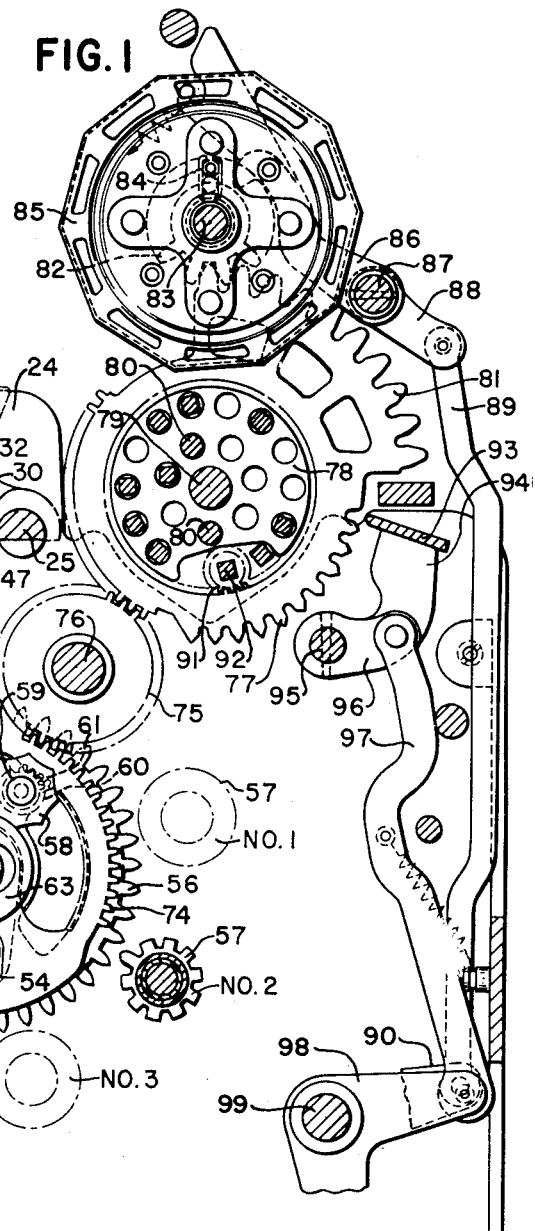
Fig. 1 is a cross-sectional side elevation of the machine, taken just to the right of one of the amount banks, showing in particular said amount bank and the differential mechanism associated therewith.
Fig. 2 is an enlarged fragmentary view showing in detail portions of the primary and secondary differential members and the improved mechanism for clutching said members together for unitary positioning movement.

The mechanism of the machine chosen to illustrate the present invention is supported by and between main right and left frames, only the left frame 20 (Fig. 1) being shown here, said frames in turn being secured in proper spaced-apart relationship to each other by a machine base plate 21 and by various cross frames, rods, and shafts. The base plate 21 may, if desired, be secured to the top surface of a drawer cabinet (not shown), having one to four drawers, depending upon the requirements of the user. The mechanism of the machine is enclosed in a suitable case or cabinet (not shown) secured at its lower edge to the base plate 21.

The mechanism of the machine is driven by the usual electric motor (not shown), which is connected by a conventional clutch mechanism to a main cam shaft 22 (Fig. 1), journaled in the framework of the machine, and drives said shaft and parts secured thereon one clockwise revolution, as viewed here, for each operation of the machine. The present machine may have two rows of motorized control keys (not shown), any of which may be arranged to release the machine for operation. In addition to the electric operating means, a hand crank is provided as an auxiliary means for operating the machine upon failure of the supply of electric current, or for adjusting and repairing the mechanism of the machine.

In addition to the two rows of motorized control keys referred to above, the present machine is provided with a plurality of denominational rows of amount keys 23, one row of which is shown in Fig. 1, along with its differential actuator mechanism for actuating the selected totalizers and for actuating the printing and indicating mechanisms. Inasmuch as the amount rows are similar in construction, it is believed that a description of the one row shown in Fig. 1, as representative of all, will suffice.

The amount keys 23 (Fig. 1) are slidably mounted in slots in a corresponding key frame 24 secured in proper position in the machine by means of upper and lower rods 25 and 26, engaged by corresponding open notches in said frame 24, said rods being supported by the main frames. The amount key frames 24 may be readily removed from the machine by turning the upper rod 25 approximately 120 degrees counter-clockwise from the position shown in Fig. 1, so that a clearance cut in said rod will permit the frames 24 to be swung out of engagement with said rod, after which said frames may be lifted out of engagement with the lower rod 26. A compressible spring 27 encircles each of the stems of the amount keys 23 near their lower ends and, in cooperation with a shoulder formed on said key stems, urges said keys upwardly to normally undepressed positions, as shown here. Each amount key 23 carries a pin 28, which coacts with a corresponding hook formed on a shiftable detent pivotally connected to the inner ends of parallel links 30 and 31, the outer ends of which are free on studs 32 and 33 fast in the frame 24. A spring 34 urges the detent 29 counter-clockwise, or upwardly, to normally maintain angular camming noses on the hooks thereon in yielding engagement with the corresponding pins 28.

Depression of an amount key, against the action of the spring 27, causes the corresponding pin 28, in cooperation with the angular nose of the corresponding hook, to shift the locking detent 29 downwardly, or clockwise, against the action of the spring 34. Clockwise movement of the detent 29 rocks the link 31 also clockwise to move an extension 35 on the lower end thereof into the path of a bent-over ear 36 formed on an arm 37 secured to a key lock and release shaft 38, journaled in the machine framework, to obstruct clockwise releasing movement of said arm and said shaft, until an amount key is fully depressed. Full depression of an amount key moves a flat upper surface on the pin 28 beyond the shoulder of the hook 29 to permit the detent 29 to be returned a slight distance upwardly, or counter-clockwise, by the spring 34, to latch said shoulder over said pin and to move the extension 35 out of the path of the ear 36 to free the key lock shaft 38 for clockwise machine-releasing movement, upon depression of a motorized control key. Clockwise releasing movement of the shaft 38 and the arm 37 causes the ear 36 to move over an arcuate surface formed on the extension 35 to obstruct clockwise movement of the link 31 and the locking detent 29, to lock the depressed amount key in depressed position, and to lock all other amount keys in this denominational row against depression, while the machine is operating. Near the end of machine operation, the shaft 38 and the arm 37 are restored counter-clockwise, in the manner explained in the co-pending applications referred to before, a slight distance beyond normal position, causing a forward surface on said arm to engage a stud 39 in the link 31 to rock said link and the detent 29 clockwise to free the depressed amount key 23 to the action of its spring 27, which immediately restores said key to undepressed position. Restoring movement of the arm 37 and the shaft 38 also terminates operation of the machine, after which said arm and shaft are spring-returned a slight distance clockwise to normal position, as shown in Fig. 1. Manual means (not shown) is provided for operating the shaft 38 and the arm 37 for manual release of depressed keys prior to machine operation.

Depression of an amount key 23 (Fig. 1) moves the inner end of its stem into the path of a projection 41 on a primary differential member 42, which, with a corresponding secondary differential member 43, is rotatably supported on a shaft 44, journaled in the main frames. Subsequent operation of the machine causes the primary and secondary differential members 42 and 43 to be positioned in accordance with the value of the depressed amount key, as will be explained presently.

In operations in which no amount key 23 is depressed in the denominational order being described, a zero stop bar 45, slidably mounted in the key frame 24, coacts with the projection 41 to locate the primary differential member 42 in zero position.

Clockwise releasing movement of the arm 37 (Fig. 1) causes said arm, in cooperation with a companion arm (not shown) to free the zero stop bar 45 to the action of a spring 40, which carries said stop bar inwardly from its full-line position to its dot-and-dash-line position, and into the path of the projection 41 on the primary differential member 42, to locate said member in zero position upon operation of the machine. Restoring movement counter-clockwise of the arm 37 restores the zero stop bar 45 outwardly to its full-line or home position.

Depression of an amount key 23 causes the pin 28 therein, in cooperation with a camming surface formed on a corresponding projection on a control plate 46, swung between parallel links 47 and 48, in turn pivotally supported by the studs 32 and 33, to rock said control plate and said links downwardly, or clockwise, against the action of a spring 49. Clockwise movement of the link 48 moves an open slot in a hook-shaped inward extension thereof over a stud 50 in the zero stop bar 45 to secure said bar against inward movement, upon releasing movement clockwise of the arm 37, as explained above, to retain said zero stop bar out of the path of the projection 41, so that said projection is free to engage and be positioned by the depressed amount key 23. Release of the depressed amount key 23, at the end of machine operation, frees the control plate 46 to the action of the spring 49, which immediately restores it and the links 47 and 48 upwardly, or counter-clockwise, to normal, or home, position, as shown here.

The primary and secondary differential members 42 and 43 are actuated by a leading rod 51 (Fig. 1), which extends through corresponding clearance slots in said primary and secondary members and is supported between similar arms 52 (only one shown) secured on the shaft 44. A comparatively strong spring 53 urges the primary differential member 42 clockwise to normally maintain a rearward surface 54 of the arcuate slot therein in yielding contact with the leading rod 51. Mechanism, not shown here, but fully disclosed in the application Serial No. 341,633, now Patent No. 2,880,930, is provided for rocking the shaft 44, the arms 52, and the leading rod 51 first clockwise, through an angle of approximately ninety degrees, and then back to home position, as shown here. Initial movement clockwise of the rod 51 permits the primary differential member 42, under the action of the spring 53, to be led in unison therewith until the projection 41 comes into contact with the end of the depressed amount key 23. This terminates the clockwise positioning movement of the primary member 42 and positions it according to the digital value of the depressed amount key, while the rod 51 continues its initial clockwise movement independently of said primary member, clearance being provided for such independent movement by the arcuate slot in said member, through which said rod 51 extends. The primary differential member 42 has, on its periphery, teeth 56, arranged to be engaged by similar teeth in corresponding denominational order totalizer wheels 57, mounted on one or more of a maximum of four totalizer lines, as shown in full lines for the No. 2 line and as shown in dot-and-dash lines for the Nos. 1, 3, and 4 lines (Fig. 1), supported in the machine framework in proper spaced relationship to each other and to the periphery of said primary member. Each line may include a maximum of nine interspersed sets of the totalizer wheels 57.

The totalizer selecting mechanism and the totalizer engaging and disengaging mechanism are neither illustrated nor described herein but are fully disclosed in the co-pending United States patent applications referred to before.

After the primary differential member 42 has been positioned, under control of the depressed amount key 23, in adding operations, as explained above, the corresponding ones of the selected sets of totalizer wheels 57 on one or more of the four totalizer lines are engaged with the teeth 56. Return movement counter-clockwise of the leading rod 51 causes said rod to engage the surface 54 and return the primary member 42 from set position to home, or zero, position, and during this return movement the selected totalizer wheels 57 are rotated clockwise an extent equivalent to the digital position of the primary member 42 under control of the depressed amount key 23. As explained before, when no amount key 23 is depressed, the zero stop bar 45 (Fig. 1) moves from the full-line position to the dot-and-dash-line position, into the path of the projection 41, to retain the primary differential member 42 in zero position upon operation of the leading rod 51.

In sub-total and total operations, often referred to as as reading and resetting operations, the corresponding wheel 57 of the selected totalizer is engaged with the teeth 56 prior to initial movement of the primary differential member 42, which movement reversely rotates said wheel to zero position, as determined by the long tooth thereon coming into contact with the tripping bail (not shown) of the tens transfer mechanism to locate said wheel in zero position and to position the primary differential member 42 accordingly. In total operations, the selected totalizer wheel 57 is disengaged from the primary differential member prior to its return movement, and consequently said wheel remains in a zeroized condition. In sub-total operations, the selected totalizer wheel 57 remains in engagement with the primary differential member and is returned in an additive direction by return movement of said primary differential member to its original position, to reenter the amount therein.

Each of the four totalizer lines is provided with a tens transfer mechanism, which coacts with the selected set of totalizer wheels 57 thereon, for transferring tens digits from lower to higher denominations, and, as this mechanism is believed not to be pertinent to the present invention, it is neither shown nor described herein but is fully disclosed in the co-pending United States patent application Serial No. 341,633.

Differential clutch mechanism

The positioning of the primary differential member 42, in adding and total-taking operations, is transmitted thereby to the corresponding secondary differential member 43, which in turn is connected by a suitable gearing to the transmission mechanism, composed of internal-external gear segments and their corresponding pinions and square shafts, and from said transmission mechanism to the corresponding indicators and type wheels for visual indication of the digital positioning of said differential members and for printing a permanent record thereof on suitable record material. The mechanism for clutching the primary and secondary members together comprises a clutch disk 58 (Figs. 1 and 2) rotatably supported on a stud 59 secured in the primary differential member 42, said disk having secured in fixed relationship thereto a pinion 60, which meshes with internal teeth 61 formed in the outer circumference of a concentric opening in the secondary member 43. The disk 58 has a plurality of symmetrical arcuate notches or surfaces 62 formed on its periphery, arranged to be engaged by the rounded inner end of a clutch pitman 63. A closed slot in the rounded head of the pitman 63 freely engages the shaft 44, while the outer end of said pitman is pivoted on a stud 64 secured in the upper arm of a bell crank 65 free on a shaft 66 supported by the machine framework. A link 67 pivotally connects the lower arm of the bell crank 65 to a cam lever 68 free on a shaft 69 supported by the machine framework. The lever 68 carries rollers 70 and 73, which coact, respectively, with the peripheries of companion plate cams 71 and 72 secured on the main cam shaft 22 and operating in unison therewith one clockwise revolution each machine operation.

When the machine is at rest and the cams 71 and 72 are in home position, as shown in Fig. 1, said cams, coacting with the lever 68, position and retain the pitman 63 in its inward position, as shown here, where the periphery of the rounded head of said pitman is concentric with the shaft 44 and is in engagement with one of the arcuate notches 62 in the disk 58 to lock said disk against rotation, thus causing the pinion 60, coacting with the internal gear teeth 61, to lock the primary and secondary differential members in fixed relationship to each other. At the beginning of machine operation, the cams 71 and 72 rock the lever 68 clockwise, which, through the link 67 and the bell crank 65, shifts the pitman 63 forwardly to disengage its periphery from the arcuate notch 62 in the disk 58, to free said disk and the pinion 60 for rotational movement and thus permit relative movement between the primary and secondary differential members 42 and 43.

After the disk 58 has thus been freed, the leading rod 51 starts its initial movement clockwise, which movement, as previously explained, positions the primary member 42 according to the value of the depressed amount key 23 in adding operations, or according to the value standing on the selected totalizer wheel 57 in reading and resetting operations, and also picks up the secondary member 43 and carries it in unison therewith from its preset position to zero, or home, position, as determined by the extent of initial clockwise movement of said leading rod 51.

After the primary member 42 has been positioned, as explained above, and the secondary member 43 restored to zero position, and prior to return movement counter-clockwise of the leading rod 51, the cams 71 and 72 return the lever 68 counter-clockwise, which, through the link 67 and the bell crank 65, restores the pitman 63 rearwardly to aline the center of the rounded head portion thereof with the center of the shaft 44, and to simultaneously engage the periphery of said rounded head portion with one of the arcuate notches 62 in the disk 58, to lock said disk against rotation and thus to secure the primary and secondary differential members in fixed relationship to each other. After the primary and secondary members have thus been locked in fixed relationship to each other, return movement counter-clockwise of the leading rod 51 picks up the primary member by engaging the downward end 54 of the arcuate slot therein and carries said member and the secondary member 43 counter-clockwise in unison therewith to return said primary member to zero position, as shown here, and to position the secondary member in accordance with the setting of said primary member.

During unitary positioning movement of the primary and secondary members 42 and 43, the notch 62 slides upon the periphery of the rounded head of the pitman 63, which, at this time, is in axial alinement with said members and the shaft 44.

From the foregoing description, it should be clear that the primary member 42, during its return movement from set position to zero, or home, position, carries the secondary member 43 in unison therewith a like number of steps from its zero, or home, position to position said secondary member and the corresponding indicators and type wheels in accordance with the value of the depressed amount key 23 in adding operations, or in accordance with the amount standing on the selected totalizer wheel 57 in reading and resetting operations.

An aliner mechanism (not shown, but fully disclosed in the applications referred to above) coacts with the teeth on the periphery of the primary differential member 42 to retain said member, the secondary member 43, and connected mechanisms in set positions during engaging and disengaging movement of the selected totalizer wheel 57, and during operation of the printing mechanism, to insure accurate accumulation and recording of amounts.

The differential positioning of the secondary member 43 (Figs. 1 and 2) is transmitted to the corresponding indicators and type wheels by means of gear teeth 74 on the periphery thereof, which mesh with and drive a gear 75 free on a shaft 76 journaled in the framework of the machine. The gear 75 in turn meshes with corresponding teeth on a transmission segment 77, having a large central bore with internal gear teeth formed therein, the ends of which teeth bear on the periphery of a corresponding disk 78 supported by a shaft 79 journaled in the main framework, said disk being retained against rotational displacement by rods 80 in cooperation with holes in said disks, said rods being supported by the main frames of the machine. An enlarged portion of the segment 77 (Fig. 1) has teeth 81, which mesh with corresponding teeth in an indicator drive gear 82 integral with a hub rotatably supported by an indicator shaft 83 journaled in the machine framework. The gear 82 is flexibly connected by a spring 84 to a corresponding indicator 85, having, on its face, numerals corresponding to the amount keys 23, which numerals are visible through a corresponding window in the case which encloses the mechanism of the machine. The gear 82 and the indicator 85 are retained in set position by the tooth of a corresponding aliner 86, secured on a shaft 87 journaled in the machine framework, said shaft also having secured thereon a crank 88 connected by a link 89 to an aliner operating lever 90 free on a rod 99 supported by the machine framework. The lever 90 is operated by a corresponding cam (not shown), secured on the cam shaft 22, in proper timing to cause said aliner 86 to coact with the teeth of the gear 82 to aline said gear and the indicator 85 in set position.

The indicator 85 shown is the front indicator, and the numerals thereon are visible through a corresponding opening in the front of the machine case. A corresponding back indicator (not shown), having numerals visible through an opening in the back of the machine case, is positioned in unison and to the same extent as the front indicator 85 by the internal gear teeth in the segment 77, in cooperation with the teeth of a corresponding pinion 91 fixed on a square transmission shaft 92 journaled in alined holes in the disks 78. Another pinion, not shown but similar to the pinion 91, mounted on the transmission shaft 92, meshes with the internal teeth of the corresponding segment, not shown but similar to the segment 77, which in turn meshes with and drives the corresponding back indicator.

The transmission shaft 92 also is connected to and drives corresponding type wheels (not shown) for the denominational order being described, said shaft having mounted thereon pinions, similar to the pinion 91, which mesh with the internal teeth of corresponding segments similar to the segment 77, said segments in turn being connected by suitable gearing to corresponding type wheels to position said type wheel in accordance with the differential adjustment of the primary and secondary differential members 42 and 43, under control of the amount keys in adding operations or the selected totalizer wheel 57 in total-taking operations.

The segment 77 (Fig. 1) has a series of aliner teeth thereon, corresponding to the various positions of said segment, arranged to be engaged by an aliner bar 93 supported between similar arms 94 (only one shown), said arms in turn secured on a shaft 95 journaled in the machine framework. Also secured on the shaft 95 is a crank 96 connected by a link 97 to a bell crank 98 free on the rod 99, said bell crank being connected by suitable linkage to an operating cam (not shown) which operates the aliner bar 93 in proper timing, to cause said bar to engage the alining teeth in the segment 77 to retain said segment and associated mechanism in set position during operation of the printing mechanism.

It is believed that a full understanding of the operation of the clutch mechanism for the primary and secondary differential members will have been obtained from a perusal of the preceding detailed description, and therefore further statement concerning the operation of the clutch mechanism is deemed unnecessary.

While the form of mechanism herein shown and described is admirably adapted to fulfill the objects primarily stated, it is to be understood that it is not intended to confine the invention to the one form or embodiment disclosed herein, for it is susceptible of embodiment in various forms, all coming within the scope and intent of the invention.

What is claimed is:

1. In a machine of the class described, having value setting means and means to register the values set up on the value setting means, the combination of a primary differential member positionable by the value setting means; a secondary differential member positionable by the primary member, said secondary member being connected to the registering means; a rotatable element mounted on the primary member and connected to the secondary member for rotation thereby, said element located within the external dimensions of the differential members; locking means integral with the element and rotatable therewith; and shiftable means shiftable into engagement with the locking means after the primary member has been positioned by the value setting means to obstruct rotational movement of said locking means and the element to clutch the primary and secondary differential members together for unitary movement after said primary member has been positioned by the value setting means to transmit the positioning of said primary member to said secondary member and to the registering means.

2. In a machine of the class described, having means to set up values and means to register the values set up, the combination of a primary differential member positionable by the value-setting means; a secondary differential member positionable by the primary member and connected to the registering means; a gear rotatably mounted on the primary differential member and meshing with teeth in the secondary differential member for rotation by said secondary member; locking means integral with the gear, said locking means having a plurality of equally-spaced notches therein; and shiftable means shiftable into engagement with the notches to obstruct rotational movement of the locking means and the gear to lock the primary and secondary differential members together for unitary movement after said primary member has been positioned by the value setting means to transfer the positioning of said primary member to said secondary member and to the registering means.

3. In a differential device for a machine of the class described, the combination of a primary differential member; means to set the primary differential member in positions corresponding to various digital values; a secondary differential member positionable by the primary differential member; a gear rotatably mounted on the primary differential member and meshing with teeth in the secondary differential member for rotation thereby; a locking element integral with the gear, said locking element having a plurality of equally-spaced locking notches in the periphery thereof; shiftable means arranged to be moved out of and into engagement with the locking notches in the locking element to first free the differential members for relative movement, and to then lock said differential members together for unitary movement; and operating means coacting with the differential members to first move the primary member from a neutral position to a position determined by the value-setting means, and to restore the secondary member to a neutral position, said operating means then effective to move said shiftable means into engagement with the locking notches and to restore the primary differential member to its neutral position to position the secondary differential member in accordance with the positioning of said primary differential member.

4. In a differential device for a machine of the class described, the combination of a rockable primary differential member; means to interrupt the rocking movement of the primary differential member in different stages of its movement in an initial direction to position said differential member according to various digital values; a rockable secondary differential member positionable by the primary differential member in accordance therewith, said differential members supported on a common axle; a gear rotatably mounted on the primary differential member and meshing with teeth in the secondary differential member; a disk integral with the gear and having a plurality of equally-spaced arcuate locking notches in the periphery thereof, said notches concentric with the axle; means including a piece with a rounded inner end for coaction with the notches, said piece supported on the axle and arranged to shift at right angles thereto; means to shift the piece out of and into engagement with the locking notches to first free the primary and secondary differential members for independent movement, and then to lock said members in fixed relationship to each other for unitary movement; and operating means effective when the differential members are free to first rotate the primary member from a neutral position in said initial direction to a position determined by the interrupting means, and to rotate the secondary member in said initial direction to a neutral position, said operating means later effective, when the differential members are locked for unitary movement, to rotate the primary member in a return direction to neutral position, and to simultaneously rotate the secondary member in said return direction to a position corresponding to the position of the primary member, as determined by the interrupting means.

5. In a machine of the class described, having means to set up digital values and means to register the digital values set up, the combination of an axle; a primary differential member rotatably mounted on the axle and positionable by the setting-up means, in accordance with the digital values thereof; a secondary differential member rotatably mounted on the axle and operatively connected to the registering means; a gear rotatably mounted on the primary member and meshing with teeth in the secondary member; a notched disk integral with the gear; a piece shiftably supported on the axle and having a rounded inner end coacting with the notched disk to secure the gear against rotation to lock the differential members in fixed relationship to each other for unitary movement; means to first shift the piece out of engagement with the notched disk to free the differential members for independent movement, said shifting means then effective to return the piece into engagement with the notched disk to lock the differential members together for unitary movement; and a constant displacement device functioning after the piece has been disengaged, to move the primary differential member from a neutral position to a position determined by the setting-up means, and to restore the secondary differential member to a neutral position, said device functioning after the piece has again been engaged with the notched disk to restore the primary differential member from set position to neutral position and to simultaneously position the secondary differential member and the registering means according to the position of said primary differential member, as determined by the setting-up means.

6. In a machine of the class described, having a denominational row of depressible keys to set up digital values, and means to register the digital values set up, the combination of rotatable primary and secondary differential members for the denominational rows of keys, said differential members mounted on a common axle, said primary member constructed and arranged to be positioned by the depressed key, according to the digital value thereof, said secondary member connected to the registering means; a gear rotatably mounted on the primary differential member and meshing with teeth in the secondary differential member; a disk integral with the gear and having a plurality of equally-spaced arcuate notches in the periphery thereof; a piece shiftably supported by the axle and having a rounded portion constructed and arranged to engage the arcuate notches to secure the gear against rotation; means to shift the piece in one direction to disengage the rounded portion from the notches to free the differential members for relative movement; and a constant displacement device operative when the rounded portion of the element is disengaged to move the primary differential member from a neutral position to a position determined by the depressed key, and to restore the secondary member to a neutral position, after which the shifting means shifts the piece in a reverse direction to return the rounded portion into engagement with one of the notches to couple the differential members together for unitary movement, whereupon continued operation of the constant displacement device restores the primary member to its neutral position and simultaneously positions the secondary member and the registering means in accordance with the digital value of the depressed key.

7. In a machine of the class described, having a row of depressible value keys for one denominational order, and means to register the values of the depressed keys, the combination of a rotatable primary differential member for said denominational order; a rotatable secondary differential member for said denominational order, said secondary differential member connected to the registering means; means effective near the beginning of a machine operation to rotate the primary differential member from a neutral position to a position determined by the depressed value key, and to rotate the secondary differential member from a preset position to a neutral position, said rotating means effective later in said machine operation to restore the primary member to neutral position; rotatable means to connect the primary and secondary differential members, said connecting means being mounted on the primary differential member and rotatable by the secondary differential member; and means to obstruct rotational movement of the connecting means to secure the primary and secondary differential members in fixed relationship to each other, so that restoring movement of said primary member to neutral position will carry said secondary member and the registering means in unison therewith to position them according to the value of the depressed key.

8. In a machine of the class described, having a row of depressible value keys, and means to register the value of the depressed keys, the combination of an axle; a primary differential member for the row of value keys, rotatably mounted on the axle, and positionable by the depressed value key; a secondary differential member for the row of value keys, rotatably mounted on the axle, and positionable by the primary differential member, said secondary member operatively connected to the registering means; a rotatable device mounted on the primary differential member and rotatable by the secondary differential member, said device, when free to rotate, permitting relative or independent rotational movement of said primary and secondary members; means effective during one machine operation to move the primary member from a neutral position to a position determined by the depressed value key, to move the secondary differential member from preset position to a neutral position, and to finally restore the primary member to its neutral position; and means operating after the primary differential member has been positioned by the depressed value key, and after the secondary member has been moved to its neutral position to obstruct rotational movement of the device to secure said primary and secondary differential members in fixed relationship to each other so that return movement of said primary member to its neutral position will carry the secondary member in unison therewith to position said secondary member and the registering means according to the value of the depressed key.

9. In a machine of the class described, having value setting means and means to register the value set up on the value setting means, the combination of a primary differential member positionable by the value setting means; a secondary differential member positionable by the primary member, said secondary member being connected to the registering means; a rotatable element mounted on the primary member and connected to the secondary member for rotation thereby, said element located within the external dimensions of the differential members; and means to obstruct rotational movement of the element to clutch the primary and secondary differential members together for unitary movement, after said primary member has been positioned by the value setting means, to transmit the positioning of said primary member to said secondary member and to the registering means.

References Cited in the file of this patent

UNITED STATES PATENTS

| | | |
|---|---|---|
| 2,088,634 | Breitling et al. | Aug. 3, 1937 |
| 2,488,143 | Rouan et al. | Nov. 15, 1949 |
| 2,530,996 | Russell | Nov. 21, 1950 |